US012744559B2

(12) United States Patent
Lee et al.

(10) Patent No.: US 12,744,559 B2
(45) Date of Patent: Sep. 22, 2026

(54) RECEPTION SIGNAL PROCESSING DEVICE AND METHOD FOR CANCELLING SELF-INTERFERENCE SIGNAL GENERATED BY TRANSMISSION SIGNAL

(71) Applicant: KOREA UNIVERSITY RESEARCH AND BUSINESS FOUNDATION, Seoul (KR)

(72) Inventors: Nam Yoon Lee, Seoul (KR); Hyowon Lee, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 299 days.

(21) Appl. No.: 18/392,259

(22) Filed: Dec. 21, 2023

(65) Prior Publication Data

US 2024/0267079 A1 Aug. 8, 2024

(30) Foreign Application Priority Data

Dec. 21, 2022 (KR) ........................ 10-2022-0180827
Feb. 16, 2023 (KR) ........................ 10-2023-0020820

(51) Int. Cl.
*H04B 1/525* (2015.01)
*H04B 17/345* (2015.01)
*H04L 5/14* (2006.01)

(52) U.S. Cl.
CPC .......... *H04B 1/525* (2013.01); *H04B 17/345* (2015.01); *H04L 5/1461* (2013.01)

(58) Field of Classification Search
CPC .................. H04B 1/525; H04B 1/0475; H04B 2001/0425; H04B 7/0456; H04B 10/616;
(Continued)

(56) References Cited

U.S. PATENT DOCUMENTS 9,893,847 B1 * 2/2018 Liao ....................... H04B 1/123
10,785,071 B2 * 9/2020 Nakajima ........... H04L 27/2607
(Continued)

FOREIGN PATENT DOCUMENTS

KR 10-0929584 B1 12/2009
KR 10-1357853 B1 2/2014
KR 10-1654626 B1 9/2016
KR 10-2233631 B1 3/2021
WO WO-2019066834 A1 * 4/2019 ........... H04L 25/024

OTHER PUBLICATIONS

Digital Self-interference cancellation in the era of machine learning: A comprehensive review Vaijayanti Panse , Tapan Kumar Jain, Prabhat Kumar Sharma, Ashwin Kothari. Dec. 1, 2021.*
(Continued)

*Primary Examiner* — Golam Sorowar

(74) *Attorney, Agent, or Firm* — Hauptman Ham, LLP

(57) ABSTRACT

A reception signal processing device for cancelling a self-interference signal generated by a transmission signal of a transceiver includes: a reception unit for receiving a reception signal including a self-interference signal; a moment generation unit for generating a moment of the reception signal; an orthogonal polynomial generation unit for generating an orthogonal polynomial by calculating orthogonal polynomial coefficients from the moment; and a digital interference cancelling unit for cancelling the self-interference signal included in the reception signal using the orthogonal polynomial.

10 Claims, 8 Drawing Sheets

(58) Field of Classification Search
CPC .............. H04B 7/0413; H04B 10/2513; H04B 2001/0433; H04B 2001/485; H04B 7/0452; H04B 1/1027; H04B 7/0417; H04B 7/0626; H04B 10/07951; H04B 10/50; H04B 10/556; H04B 10/6161; H04B 17/24; H04B 1/123; H04B 15/00; H04B 7/026; H04B 1/0483; H04B 1/1036; H04B 1/109; H04L 27/2647; H04L 5/14; H04L 25/0202; H04L 25/0224; H04L 25/0204; H04L 25/03006; H04L 5/0007; H04L 5/0048; H04L 25/022; H04L 25/03343; H04L 5/0021; H04L 25/0212; H04L 7/027; H04L 1/04; H04L 27/2637; H04L 5/1461; H04L 1/0056; H04L 1/0618; H04L 25/0228; H04L 25/0242; H04L 25/0244; H04L 25/025; H04L 25/03057
See application file for complete search history.

(56) References Cited

U.S. PATENT DOCUMENTS

| | | | | |
|---|---|---|---|---|
| 11,343,062 | B2 | 5/2022 | Lee et al. | |
| 2015/0043323 | A1* | 2/2015 | Choi | H04B 1/62 370/203 |
| 2022/0271782 | A1 | 8/2022 | Arditti Ilitzky et al. | |
| 2024/0080053 | A1* | 3/2024 | Velazquez | H04B 1/40 |

OTHER PUBLICATIONS

Hyowon Lee et al., “Adapative basis generation technique for input signals using some moment-based normalized orthogonal polynomials”, 2022 Korea Communications Society Fall Conference, machine translation, 4 pages.

Jungyeon Kim et al., “Adaptive Non-Linear Digital Self-Interference Cancellation for Full-duplex Wireless Systems Using Ito-Hermite Polynomials”, 2018 IEEE International Conference on Communications Workshops, May 20-24, 2018, 7 pages.

* cited by examiner

RECEPTION SIGNAL PROCESSING DEVICE AND METHOD FOR CANCELLING SELF-INTERFERENCE SIGNAL GENERATED BY TRANSMISSION SIGNAL

CROSS-REFERENCE TO RELATED APPLICATION

The present application claims the benefit of priority to Korean Patent Application No. 10-2022-0180827, filed on Dec. 21, 2022 and Korean Patent Application No. 10-2023-0020820, filed on Feb. 16, 2023 in the Korean Intellectual Property Office. All of the aforementioned applications are hereby incorporated by reference in their entireties.

BACKGROUND

Technical Field

The present disclosure relates to a reception signal processing device and a method for cancelling a self-interference signal generated by a transmission signal of a transceiver, and more specifically, to a device, a method, and a system for cancelling the self-interference signal considering time-varying signals generated due to frequency difference when there are nonlinearity and frequency difference in a power amplifier (PA), which occur when a self-interference signal generated by a transmission signal of the transceiver is input into the reception unit.

Related Art

The present disclosure relates to a reception signal processing device and a method for cancelling a self-interference signal generated by a transmission signal of a transceiver, and more specifically, to a device, a method, and a system for cancelling the self-interference signal considering time-varying signals generated due to frequency difference when there is a nonlinear power amplifier (PA) (nonlinearity of a PA) and a frequency difference that occur when a self-interference signal generated by a transmission signal of the transceiver is input into the frequency of a reception unit.

SUMMARY

It is an object of the present disclosure to provide a device and method for cancelling a self-interference signal in a reception signal processing device by considering information on the frequencies of transmitting and receiving ends and the difference of the frequencies that exist in out-of-band emission (OOBE), including nonlinearity and self-interference due to a PA.

To accomplish the above object, according to an aspect of the present disclosure, there is provided a reception signal processing device for cancelling a self-interference signal generated by a transmission signal of a transceiver, the device including: a reception unit for receiving a reception signal including a self-interference signal; a moment generation unit for generating a moment of the reception signal; an orthogonal polynomial generation unit for generating an orthogonal polynomial by calculating orthogonal polynomial coefficients from the moment; and a digital interference cancelling unit for cancelling the self-interference signal included in the reception signal using the orthogonal polynomial.

In addition, the moment generation unit generates the moment from distribution of the reception signal using Equation 1 shown below.

$$\mu_m = \frac{1}{N}\sum_n |x[n]|^m \quad \text{[Equation 1]}$$

Here, $\mu_m$ represents a moment, N represents a unit time, and x[n] represents a reception signal vector of n-th time.

In addition, the orthogonal polynomial generation unit generates a matrix configured of vectors of the moments, and calculate coefficients of the orthogonal polynomial based on the matrix.

In addition, the orthogonal polynomial generation unit generates the orthogonal polynomial by performing normalization on the coefficients of the orthogonal polynomial.

In addition, the orthogonal polynomial generation unit determines whether the moment changes over time, and update the coefficients based on the change.

In addition, the digital interference cancelling unit cancels the self-interference signal by using the orthogonal polynomial as a basis function.

According to another aspect of the present disclosure, there is provided a reception signal processing method of cancelling a self-interference signal generated by a transmission signal of a transceiver, the method including the steps of: receiving a reception signal including a self-interference signal; generating a moment of the reception signal; generating an orthogonal polynomial by calculating orthogonal polynomial coefficients from the moment; and cancelling the self-interference signal included in the reception signal using the orthogonal polynomial.

In addition, the step of generating a moment includes the step of generating the moment from distribution of the reception signal using Equation 1 shown below.

$$\mu_m = \frac{1}{N}\sum_n |x[n]|^m \quad \text{[Equation 1]}$$

Here, $\mu_m$ represents a moment, N represents a unit time, and x[n] represents a reception signal vector of n-th time.

In addition, the step of generating an orthogonal polynomial includes the steps of: generating a matrix configured of vectors of the moments; and calculating coefficients of the orthogonal polynomial based on the matrix.

In addition, the step of generating an orthogonal polynomial further includes the step of generating the orthogonal polynomial by performing normalization on the coefficients of the orthogonal polynomial.

In addition, the step of generating an orthogonal polynomial further includes the steps of: determining whether the moment changes over time; and updating the coefficients based on the change.

In addition, the step of cancelling the self-interference signal includes the step of cancelling the self-interference signal by using the orthogonal polynomial as a basis function.

DETAILED DESCRIPTION

Figure 1:
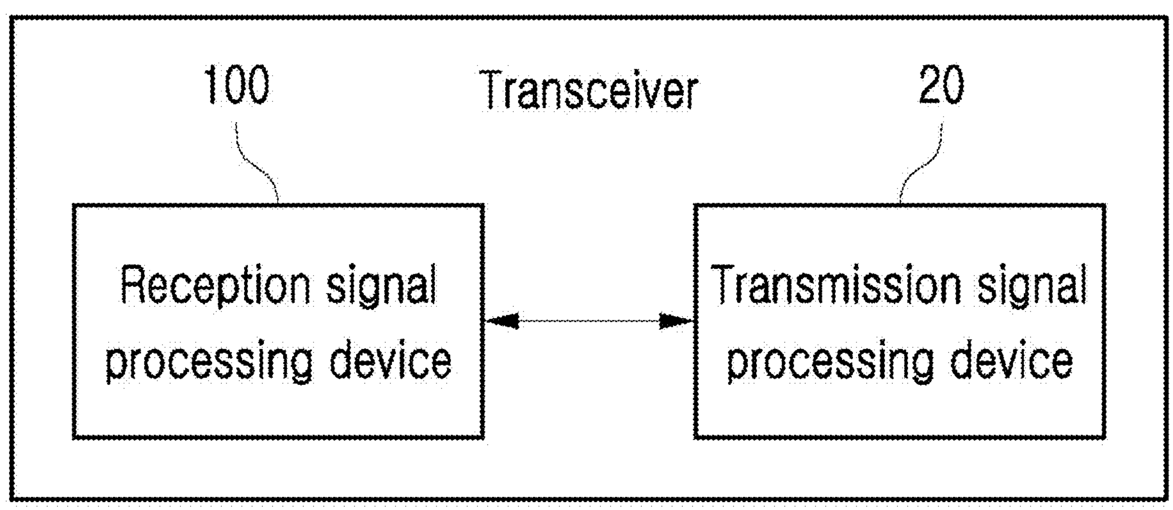
FIG. 1 is a block diagram showing a schematic configuration of a transceiver including a reception signal processing device according to an embodiment of the present disclosure.

The detailed description of the present invention described below refers to the accompanying drawings that show, by way of example, specific embodiments in which the present invention may be practiced. These embodiments are described in sufficient detail for those skilled in the art to practice the present invention. It should be understood that although various embodiments of the present invention are different from one another, they do not need to be mutually exclusive. For example, specific shapes, structures and characteristics described herein may be implemented in different embodiments without departing from the spirit and scope of the present invention. In addition, it should be understood that the locations or arrangements of individual components in each disclosed embodiment may be changed without departing from the spirit and scope of the present invention. Accordingly, the detailed description described below is not intended to be taken in a limiting sense, and the scope of the present invention is limited only by the appended claims, together with all the scope equivalent to those claimed in the claims, if properly described. Similar reference numerals in the drawings refer to identical or similar functions across various aspects.

Hereinafter, preferred embodiments of the present disclosure will be described in more detail with reference to the drawings.

Figure 2:
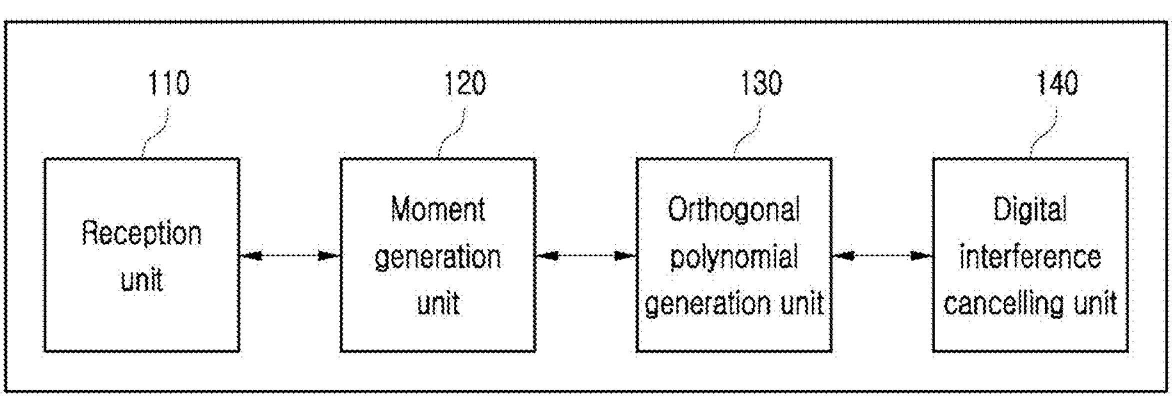
FIG. 2 is a block diagram showing a schematic configuration of a reception signal processing device according to an embodiment of the present disclosure.

FIG. 1 is a block diagram showing a schematic configuration of a transceiver 10 including a reception signal processing device 100 according to an embodiment of the present disclosure, and FIG. 2 is a block diagram showing a schematic configuration of a reception signal processing device 100 according to an embodiment of the present disclosure.

Referring to FIGS. 1 and 2, the transceiver 10 according to an embodiment of the present disclosure includes a reception signal processing device 100 and a transmission signal processing device 20. The reception signal processing device 100 and the transmission signal processing device 20 include a transmission unit (not shown) and a reception unit 110 that use different frequencies.

In the case of the transceiver 10 that uses different frequencies, signals are transmitted after being amplified by a power amplifier (PA) of the transmission unit considering channel attenuation, noise, and the like between the transmission unit and the reception unit 110, and this is the main cause of nonlinearity of the signals. A nonlinear transmission signal resulting therefrom is received by the reception unit 110 as a self-interference signal, which occurs a self-interference problem.

The transmission signal processing device 20 according to an embodiment performs a series of transmission signal processing operations of transmitting signals through a transmission channel by performing up-sampling and pulse shaping on transmission signal x generated in conformance to the standard and performing up-conversion to a frequency for transmission and amplification of power through a power amplifier.

As a main configuration of the present disclosure according to the embodiment, the reception signal processing device 100 performs a series of operations described below to cancel the self-interference signal generated by the transmission signal of the transceiver 10.

For example, the reception signal processing device 100 receives a reception signal including a self-interference signal, generates a moment of the received reception signal, generates an orthogonal polynomial by calculating orthogonal polynomial coefficients from the moment, and cancels the self-interference signal included in the reception signal using the generated orthogonal polynomial.

Referring to FIG. 2, the reception signal processing device 100 includes a reception unit 110 for receiving a reception signal including a self-interference signal, a moment generation unit 120 for generating a moment of the reception signal, an orthogonal polynomial generation unit 130 for generating an orthogonal polynomial by calculating orthogonal polynomial coefficients from the moment, and a digital interference cancelling unit 140 for cancelling the self-interference signal included in the reception signal using the orthogonal polynomial.

The reception unit 110 receives a reception signal including a self-interference signal generated by a transmission signal.

The moment generation unit 120 generates a moment from the distribution of the reception signal received through the reception unit 110. Equation 1 shown below may be used to generate the moment.

$$\mu_m = \frac{1}{N}\sum_n |x[n]|^m \qquad \text{[Equation 1]}$$

In Equation 1, $\mu_m$ represents the moment, N represents a unit time, and x[n] represents a reception signal vector of the n-th time. The moment generation unit 120 calculates and generates a moment from the distribution of the reception signal at each time unit of receiving the reception signal as an empirical moment as shown in Equation 1.

In relation thereto, since the reception signal received through the reception unit 110 is generated as the transmission signal is transmitted through the transceiver 10, the transmission signal that may be expressed as shown in Equations 2 and 3 will be described before explaining distribution of the self-interference signal and the reception signal and a moment according thereto.

$$x_p[n] = (g_t * x)[n] = \sum_{l=0}^{L} g_t[l]x[n-l] \quad \text{[Equation 2]}$$

$$x_b(t) = \sum_n x_p[n]\mathrm{sinc}(W_t - n)$$

$$x_{tx}(t) = f_{PA}\left(\mathrm{Real}\left(x_b(t)e^{-j2\pi f_{up}t}\right)\right) \quad \text{[Equation 3]}$$

In Equation 2, $g_t$ represents a pulse shaping filter, W represents the bandwidth, and $x_p[n]$ and $x_b$ (t) represent the discrete signal and continuous signal after pulse shaping of the transmission signal, respectively. In Equation 3, $f_{up}$ is the up-conversion frequency of the transmission signal, and $f_{PA}(.)$ is the response function of the pass band power amplifier. The transmission signal $x_{tx}(t)$ generated and radiated through the transmission signal processing device 20 passes through a transmission channel and then goes through down-conversion in the reception signal processing device 100. In the present disclosure, it is assumed that the channel coherence time of a channel, in which the influence of the channel does not change significantly over a predetermined period of time, is long enough to allow tracking. Therefore, the reception signal affected by the channel and noise may be expressed in a convolution form as shown in Equation 4 below.

$$y_{rx}(t) = (h * x_{tx})(t) + v(t) \quad \text{[Equation 4]}$$

In Equation 4, h is the channel coefficient between the transmission unit and the reception unit, * denotes convolution, v (t) is a white Gaussian noise signal, the average is 0, and the variance is determined according to the magnitude of the noise level.

$$y_{dc}(t) = y_{rx}(t)e^{j2\pi f_{down}t} \quad \text{[Equation 5]}$$

Equation 5 means a reception signal down-converted at the receiving end, and $f_{down}$ is the down-conversion frequency of the reception unit.

Equation 4 is an equation considering the channel and noise between the transmission unit (not shown) and the reception unit 110, and Equation 5 is an equation considering different up-conversion and down-conversion frequencies and different paths.

Although an actual reception signal is a continuous time signal as shown in the above equations, it may also be expressed as a discrete baseband equivalent model, and this may be expressed as shown in Equation 6.

$$y[n] = e^{\frac{j2\pi n\Delta f}{f_{BW}}} f(x[n], \ldots, x[n-M+1]) + v[n] \quad \text{[Equation 6]}$$

Equation 6 is an equation that represents modeling of a reception signal received at the reception signal processing device 100 caused by a transmission signal transmitted. In Equation 6, y[n] represents a reception signal, and function f(.) includes a linear filter such as the response of the nonlinear PA, the pulse shaping filter (not shown) of the transmission signal processing device 20, a low-pass filter (not shown) and a shaping filter (not shown) of the reception signal processing device 100, and the like. Since the nonlinearity due to the frequency difference Δf between up-conversion and down-conversion in the reception signal is not simply expressed as reception signal x, the reception signal processing device 100 separately calculates $$e^{\frac{j2\pi n\Delta f}{f_{BW}}}$$

to compensate for corresponding nonlinearity. Here, $f_{BW}$ means the bandwidth frequency of the signal.

Thereafter, the orthogonal polynomial generation unit 130 generates an orthogonal polynomial using the moment generated through the moment generation unit 120.

In this regard, an embodiment, in which the orthogonal polynomial generation unit 130 generates an orthogonal polynomial using the transmission signal and the reception signal described with reference to Equations 2 to 6 and the moment acquired from the moment generation unit 120 using Equation 1, will be described with reference to FIG. 3.

Figure 3:
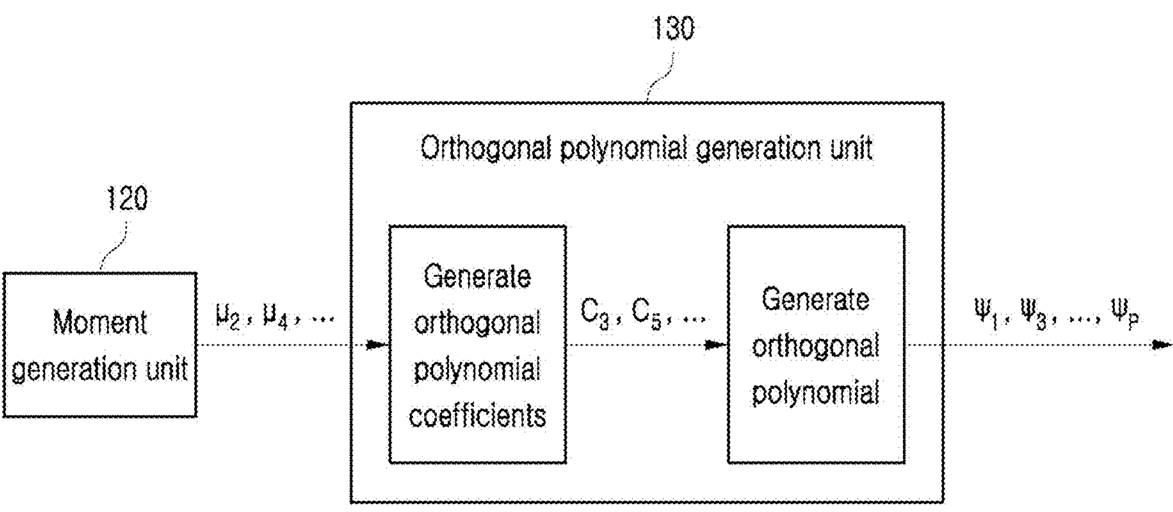
FIG. 3 is a conceptual view illustrating an embodiment of generating an orthogonal polynomial by an orthogonal polynomial generation unit according to an embodiment of the present disclosure.

FIG. 3 is a conceptual view illustrating an embodiment of generating an orthogonal polynomial by an orthogonal polynomial generation unit 130 according to an embodiment of the present disclosure.

The orthogonal polynomial generation unit 130 generates a matrix configured of vectors of the moments generated through the moment generation unit 120, and calculates coefficients of the orthogonal polynomial based on the matrix.

Specifically, the orthogonal polynomial generation unit 130 calculates coefficients of the orthogonal polynomial using the moment generated through the moment generation unit 120 and the orthogonal polynomial condition of Equation 7 shown below. Equation 7 is an equation expressing the orthogonal polynomial condition, and Equation 8 is an equation expressed when Equation 7 is expanded into a determinant with the assumption that the highest order term of each polynomial is 1.

$$\psi_{2p-1}(x) = \sum_{m=1}^{v} c_{2m-1}|x|^{2(m-1)}x \quad \text{[Equation 7]}$$

$$\begin{cases} \psi_i^*(x)\psi_j(x) = 1, & i = j \\ \psi_i^*(x)\psi_j(x) = 0, & i \neq j \end{cases}$$

In Equation 7, $\psi_{2p-1}$ is a polynomial basis function of which the highest order term is 2p−1, and $C_{2m-1}$ is the coefficient of the orthogonal polynomial. The basis function has a characteristic of being orthogonal to each other and satisfies the conditions of the second equation of Equation 7.

$$M_{2p-1}\overline{c}_{2p-1} + b_{2p-1} = 0 \quad \text{[Equation 8]}$$

In Equation 8, $M_{2p-1}$ has a Hankel-type matrix like Equation 9 from the empirical moment acquired through Equation 1, $\bar{c}_{2p-1}$ is a vector of coefficients excluding the highest order term, and $b_{2p-1}$ is a vector configured of moments as shown in Equation 10.

$$M_{2p-1} = \begin{bmatrix} \mu_2 & \mu_4 & \cdots & \mu_{2(p-1)} \\ \mu_4 & \mu_6 & \cdots & \mu_{2p} \\ \vdots & \vdots & \ddots & \vdots \\ \mu_{2(p-1)} & \mu_{2p} & \cdots & \mu_{4p-6} \end{bmatrix} \quad \text{[Equation 9]}$$

$$b_{2p-1} = \begin{bmatrix} \mu_{2p} \\ \mu_{2p+2} \\ \vdots \\ \mu_{4p-4} \end{bmatrix} \quad \text{[Equation 10]}$$

The orthogonal polynomial generation unit 130 obtains $\bar{c}_{2p-1}$ from Equations 7 to 10 as a coefficient that satisfies the orthogonal polynomial conditions. In addition, in obtaining $\bar{c}_{2p-1}$, a form of $M_{2p-1}$ is predicted, and since it can be obtained from an empirical moment known in advance, when $M_{2p+1}$ is expressed as shown in Equation 11, the inverse matrix may be obtained simply as a combination of matrix product forms using Schur complement as shown in Equation 12.

$$M_{2p+1} = \begin{bmatrix} M_{2p-1} & \mu_{2p-1} \\ \mu_{2p-1} & r_{2p-1} \end{bmatrix} \quad \text{[Equation 11]}$$

$$M_{2p+1}^{-1} = \quad \text{[Equation 12]}$$

$$\begin{bmatrix} M_{2p-1}^{-1} + M_{2p-1}^{-1}\mu_{2p-1}s_{2p-1}^{-1}\mu_{2p-1}^{\top}M_{2p-1}^{-1} & -M_{2p-1}^{-1}\mu_{2p-1}s_{2p-1}^{-1} \\ -s_{2p-1}^{-1}\mu_{2p-1}^{\top}M_{2p-1}^{-1} & s_{2p-1}^{-1} \end{bmatrix}$$

$$s_{2p-1} = r_{2p-1} - \mu_{2p-1}^{\top}M_{2p-1}^{-1}\mu_{2p-1}$$

The orthogonal polynomial generation unit 130 obtains an inverse matrix by combining the product forms of the matrix using Schur complement that may be expressed as shown in Equation 12. Since the orthogonal polynomial coefficients obtained in this way has a correlation of 0 for polynomials of different orders, which is satisfied for the second equation in Equation 7, i.e., the orthogonal polynomial condition, but does not guarantee the first equation in Equation 7, i.e., the autocorrelation condition, the orthogonal polynomial generation unit 130 performs a coefficient normalization process as shown in Equation 13 for this purpose.

$$c_{2p-1} = [1, \bar{c}_{2p-1}] \quad \text{[Equation 13]}$$

$$\tilde{c}_{2p-1} = c_{2p-1} * c_{2p-1}$$

$$\hat{c}_{2p-1} = c_{2p-1} \Big/ \sqrt{\sum_{k=1}^{2p-1} \tilde{c}_{2p-1,k}\mu_{2k}}$$

Equation 13 is an equation expressing the coefficient normalization process of the orthogonal polynomial generation unit 130 for orthogonal polynomials. When the coefficient normalization of Equation 13 is performed, the final orthogonal polynomial may be expressed as shown in Equation 14.

$$\psi_{2p-1}(x[n]) = \sum_{m=1}^{p} \hat{c}_{2m-1}|x|^{2(m-1)}x \quad \text{[Equation 14]}$$

In an embodiment, the moment may change when a time-varying signal is generated due to the frequency difference, i.e., according to change of time. Accordingly, the orthogonal polynomial generation unit 130 determines whether the moment changes over time and updates coefficients of the orthogonal polynomial based on whether the moment changes. This will be explained with reference to FIG. 4.

Figure 4:
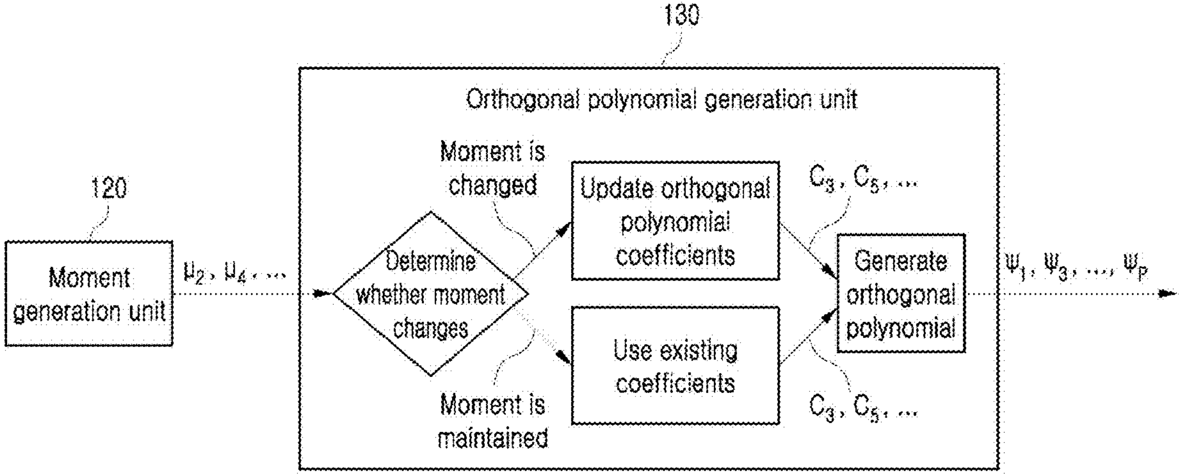
FIG. 4 is a conceptual view illustrating an embodiment of adaptively updating coefficients of an orthogonal polynomial according to moment change by an orthogonal polynomial generation unit according to an embodiment of the present disclosure.

FIG. 4 is a conceptual view illustrating an embodiment of adaptively updating coefficients of an orthogonal polynomial according to moment change by an orthogonal polynomial generation unit 130 according to an embodiment of the present disclosure.

Since the moment according to the reception signal is used for generation of the orthogonal polynomial according to the present disclosure, it has an advantage of flexibly generating an orthogonal polynomial with respect to distribution of the reception signal, in which the moment may change over time. When the orthogonal polynomial generation unit 130 determines that the moment used for the generated orthogonal polynomial is sufficiently different from the moment of the current reception signal, the orthogonal polynomial generation unit 130 finds new coefficients of the orthogonal polynomial and updates the basis.

Specifically, the orthogonal polynomial generation unit 130 determines change in the moment generated by the moment generation unit 120. When it is determined that the moment has been changed as a result of determining change in the moment, the orthogonal polynomial generation unit 130 generates coefficients of the orthogonal polynomial based on the changed moment using Equations 9 to 14, perform normalization on the coefficients using Equation 15, and then generate a final orthogonal polynomial in a form as shown in Equation 16.

Referring again to FIG. 2, in an embodiment, the digital interference cancelling unit 140 cancels the self-interference signal included in the reception signal using an orthogonal polynomial. Specifically, the digital interference cancelling unit 140 cancels the self-interference signal using the orthogonal polynomial as a basis function.

In relation thereto, a least mean square (LMS) algorithm, which is one of conventional adaptive filter algorithms for cancelling self-interference signals, and a parallel Hammerstein model LMS (PH-LMS) algorithm using a parallel Hammerstein model are introduced, and technical limitations of the prior art and an improvement method proposed by the present disclosure will be described.

A method of finding unknown system parameters includes the Wiener filtering technique of estimating parameters using least square estimation from information on a reception signal and output signals of the system for all times. However, this method has a delay problem of waiting until the N-th time for the stack of the reception signal and output signal, and there is a problem of increasing computational complexity as an inverse of the matrix is used.

To solve the problem, adaptive filters have been studied as one of the methods of estimating system parameters using information updated every hour. In an embodiment of the present disclosure, the adaptive filter may be a component included in the digital interference cancelling unit 140 and operating as a filter for cancelling self-interference signals, but this is not limited thereto. When the number of taps of a general adaptive filter is p, information required for the adaptive filter is the reception signal vector x[n] at the n-th time, and a desired signal d [n] that is obtained by adding noise to the output signal y[n] of the system. When a product of the adaptive filter $\hat{w}[n]$ estimated at time n and the signal, i.e., the difference between system output $\hat{y}[n]$ estimated using a filter and the actual signal of the system, is defined as an error e[n], the purpose of the reception signal processing device 100 is to reduce the square of the magnitude of the error, $|e[n]|^2$, which is a cost function. In this way, the LMS algorithm updates the adaptive filter $\hat{w}[n+1]$ on the basis of gradient descent (steepest descent).

Therefore, the derivation and structure of the LMS algorithm are as shown in Equation 15 below.

$$e[n] = d[n] - \hat{y}[n] = d[n] - \hat{w}^H[n]x[n] \quad \text{[Equation 15]}$$

$$C[n] = E\{|e[n]|^2\}$$

$$\nabla_{\hat{w}^H} C[n] = 2E\{\nabla_{\hat{w}^H} e[n]e^*[n]\}$$

$$\nabla_{\hat{w}^H} e[n] = -x[n]$$

$$\hat{E}\{x[n]e^*[n]\} = \frac{1}{N}\sum_{i=0}^{N-1} x[n-i]e^*[n-i] = x[n]e^*[n], \quad (N=1)$$

$$\hat{w}^H[n+1] = \hat{w}^H[n] - \frac{\mu}{2}\nabla_{\hat{w}^H} C[n]$$

$$\hat{w}^H[n+1] = \hat{w}^H[n] + \frac{\mu}{2}x[n]e^*[n]$$

In Equation 15, E means an expected value, u is the step size of gradient descent, and these parameters affect the convergence speed of the LMS algorithm. Although the gradient of the cost function in Equation 7 shown below has an expected value, as it is difficult to calculate in practice, it is calculated using an empirically expected value Ê. In addition, a case of N=1 is considered, and this is the simplest case among the calculations of the empirically expected value. As described, as the LMS algorithm uses only a reception signal as a basis for tracking system parameters, it is difficult to track the system parameters when the reception signal has nonlinearity.

The mean square error (MSE) may be decreased over time by estimating the nonlinear function f(.) using the basis of the adaptive filter introduced above. However, based on the theory of the adaptive filters, there is a difference in the performance of convergence according to the correlation of the reception signal.

That is, in this problem, there is a difference in the convergence speed of the adaptive filter according to the correlation of the basis function, and it is known that the smaller the correlation, the faster the convergence. Based on this fact, a fast convergence speed can be achieved by using the basis signal as an Ô-Hermite polynomial having orthogonality in the corresponding distribution by taking advantage of the fact that a signal approximates the Gaussian distribution by the central limit theorem when the signal goes through an inverse fast Fourier transform (IFFT), such as the orthogonal frequency division multiplexing (OFDM) modulation, in the prior art. However, the conventional method has a disadvantage in that it is only limited to the Gaussian distribution, and when the size of the Fourier transform is not large enough or the OFDM modulation is not used, the corresponding basis has a high correlation, and the convergence speed is reduced.

To solve the above problem, the PH-LMS method, which uses a reception signal and a nonlinear value based on the reception signal as a basis function, has been studied as a method for improving the LMS algorithm, and it may be expressed as shown in Equation 16.

$$\psi_m(x) = |x|^{2m-1}x \quad \text{[Euation 16]}$$

The PH-LMS algorithm expressed as shown in Equation 16 is an algorithm that finds an adaptive filter using a basis signal of multiple orders. That is, by adding a nonlinear element to the base signal, the nonlinear part of the system can be found using a filter.

Accordingly, when the digital interference cancelling unit 140 estimates system parameters of the nonlinear function by applying the orthogonal polynomial derived through Equation 14 to the basis function that may be expressed as Equation 16, the self-interference signal of the reception signal may be cancelled, and thus the conventional problems described above can be solved effectively.

Figure 5:
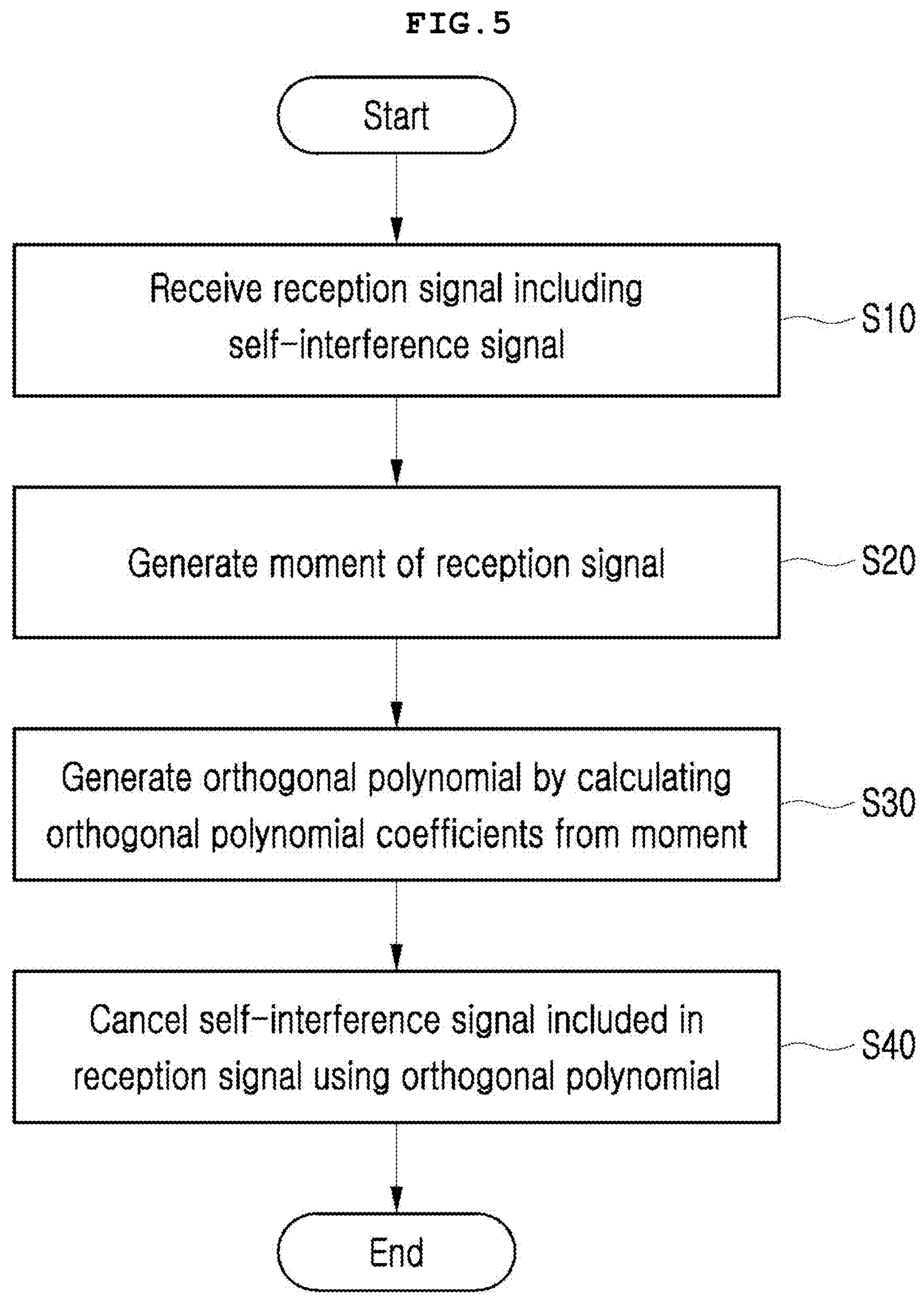
FIG. 5 is a flowchart illustrating each step of operating a reception signal processing device according to an embodiment of the present disclosure.

FIG. 5 is a flowchart illustrating each step of operating a reception signal processing device 100 according to an embodiment of the present disclosure.

Since the reception signal processing method according to an embodiment of the present disclosure is performed on a configuration substantially the same as that of the transceiver 10 shown in FIG. 1 and the reception signal processing device 100 shown in FIG. 2, like reference numerals will be assigned to like components of the transceiver 10 shown in FIG. 1 and the reception signal processing device 100 of FIG. 2, and repeated description thereof will be omitted.

The reception signal processing method of the present disclosure includes the steps of receiving a reception signal including a self-interference signal (S10), generating a moment of the reception signal (S20), generating an orthogonal polynomial by calculating orthogonal polynomial coefficients from the moment (S30), and cancelling the self-interference signal included in the reception signal using the orthogonal polynomial (S40).

At the step of receiving a reception signal including a self-interference signal (S10), the reception signal is generated as the transmission signal is transmitted and then received through the reception unit 110.

At the step of generating a moment of the reception signal (S20), the reception signal processing device 100 generates a moment from the distribution of the reception signal using Equation 1.

At the step of generating an orthogonal polynomial by calculating orthogonal polynomial coefficients from the moment (S30), the reception signal processing device 100 generates a matrix configured of moment vectors and calculates coefficients of the orthogonal polynomial based on the matrix.

In addition, the reception signal processing device 100 generates the orthogonal polynomial by performing normalization on the coefficients of the orthogonal polynomial. Additionally, the reception signal processing device 100 determines whether the moment changes over time and updates the coefficients based on the change. When the coefficients are updated based on whether the moment changes, the reception signal processing device 100 updates the orthogonal polynomial by performing each operation of steps S10 to S30 again.

At the step of cancelling the self-interference signal included in the reception signal using the orthogonal polynomial (S40), the reception signal processing device 100 cancels the self-interference signal by using the orthogonal polynomial as a basis function.

Hereinafter, a simulation process of comparing the LMS algorithm of a conventional technique, the PH-LMS algorithm considering nonlinearity, a method using an ItÔ-

Hermite polynomial having an orthogonal polynomial when the reception signal has a Gaussian distribution, and a method of cancelling a self-interference signal using an orthogonal polynomial according to an embodiment of the present disclosure (reception signal processing method), and a result thereof will be described with reference to FIGS. 6 to 10 in order to verify the effect of the present disclosure.

The simulation presents a graph that compares presence or absence of normalization or the like of the orthogonal polynomial, together with performance that varies according to distribution of the reception signal.

Figure 6:
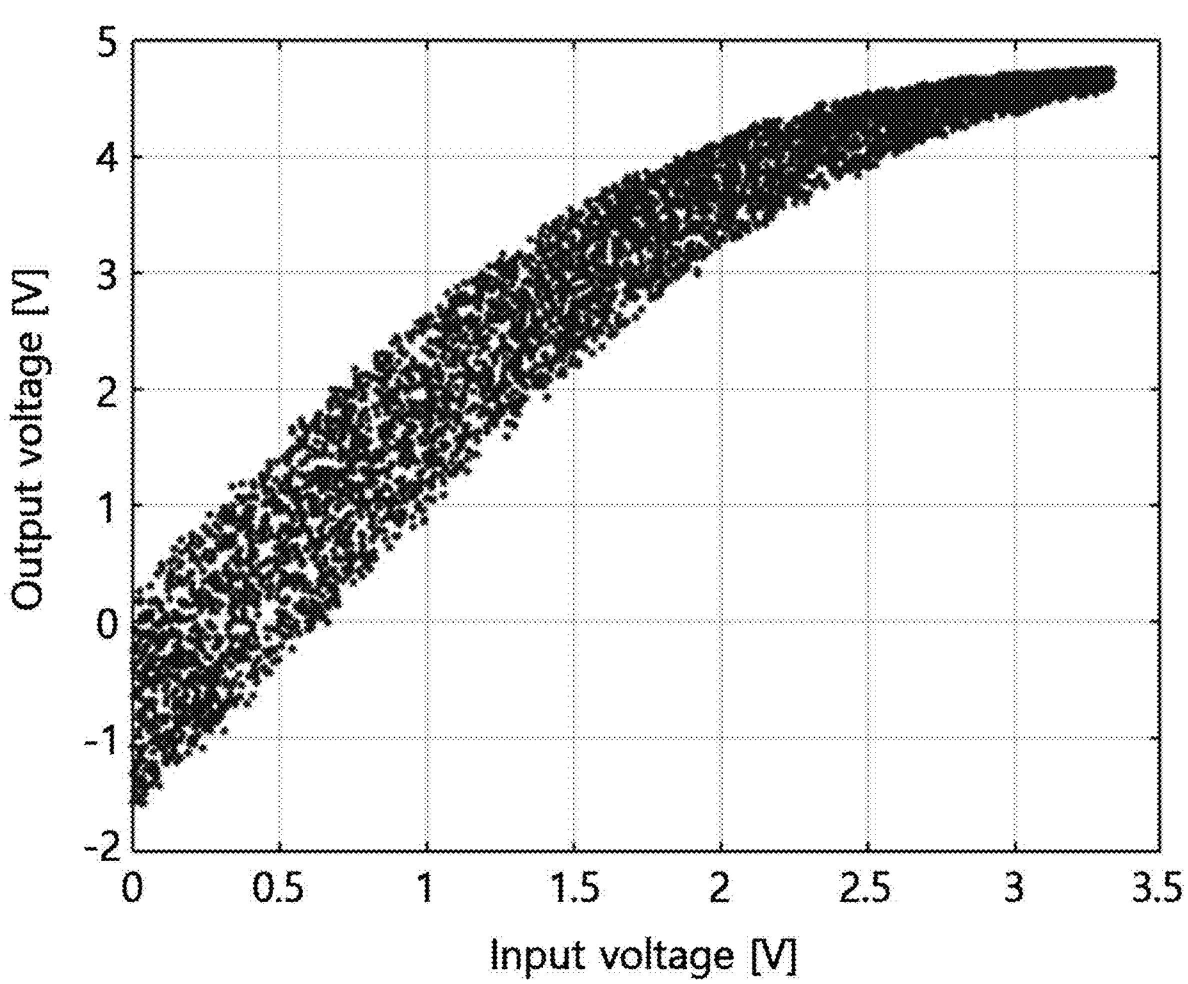
FIG. 6 is an example showing a nonlinear baseband equivalent model used in a transceiver according to an embodiment of the present disclosure.

FIG. 6 is an example showing a nonlinear baseband equivalent model used in a transceiver according to an embodiment of the present disclosure.

As mentioned above, the value of Equation 17 that has corrected the frequency difference by the input of the digital interference canceller is considered for the effect of frequency difference generated due to up-conversion and down-conversion.

$$x[n]e^{\frac{j2\pi n\Delta f}{f_{BW}}} \quad \text{[Equation 17]}$$

In addition, the Saleh PA model as shown in Equation 18 is used as an example considering the memory effect of the power amplifier, but this is not limited thereto.

$$f(x[n], x[n-1], \ldots, x[n-M+1]) = \sum_{m=0}^{M-1} h_m \frac{\gamma x[n-m]}{1+\beta|x[n-n} \quad \text{[Equation 18]}$$

In Equation 18, $h_n$ is the memory effect coefficient, y represents a small signal gain, and B represents transition sharpness, and an example of response may appear as shown in FIG. 6.

Figure 7:
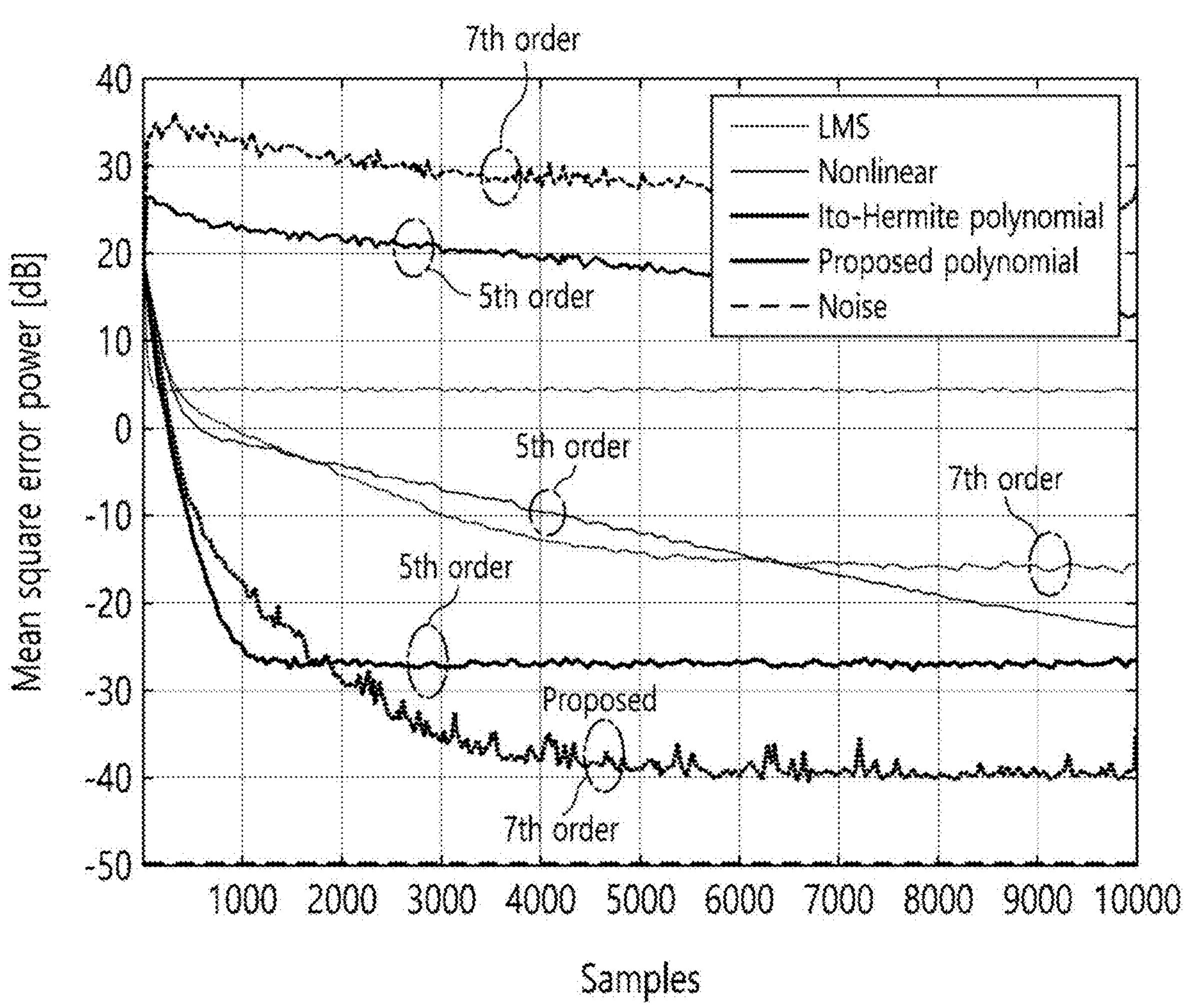
FIG. 7 is a result graph showing errors according to samples when distribution of a reception signal is in a Gaussian distribution in the algorithm according to an embodiment of the present disclosure and the conventional algorithm.
Figure 8:
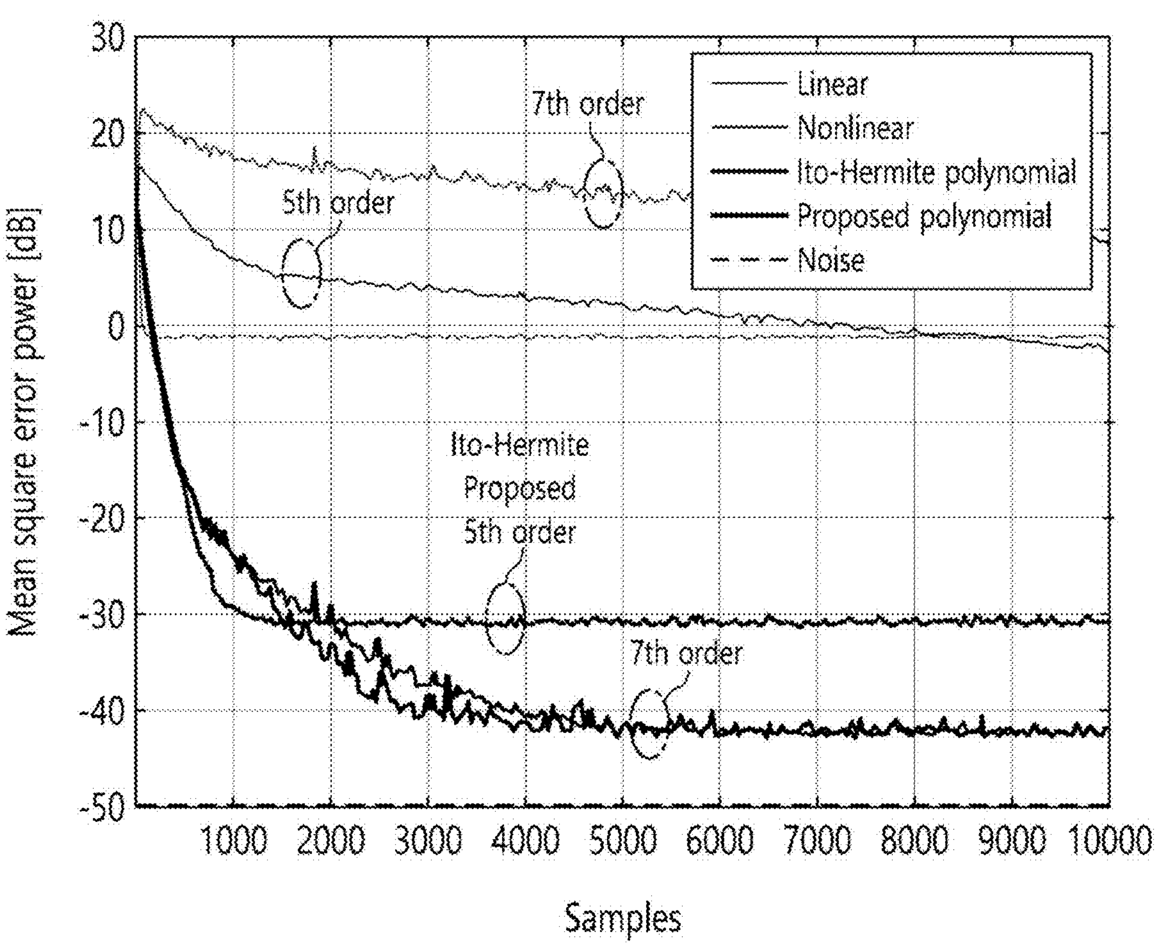
FIG. 8 is a result graph showing errors according to samples when distribution of a reception signal is in a non-Gaussian distribution in the algorithm according to an embodiment of the present disclosure and the conventional algorithm.

FIG. 7 is a result graph showing errors according to samples when distribution of a reception signal is a Gaussian distribution in the algorithm according to an embodiment of the present disclosure and the conventional algorithm, and FIG. 8 is a result graph showing errors according to samples when distribution of a reception signal is a non-Gaussian distribution in the algorithm according to an embodiment of the present disclosure and the conventional algorithm.

FIGS. 7 and 8 show the results of the comparison among conventional algorithms and the LMS algorithm using the basis proposed in the present disclosure in this environment. FIG. 6 shows when the reception signal follows a Gaussian distribution, and it can be confirmed that the performance is almost the same as the performance that is shown when the ItÔ-Hermite polynomial, which is a known orthogonal polynomial in the corresponding distribution, is used as the basis, whereas since the reception signal no longer follows a Gaussian distribution in FIG. 7, it can be confirmed that the performance significantly deteriorates in the case of the ItÔ-Hermite polynomial basis.

Figure 9:
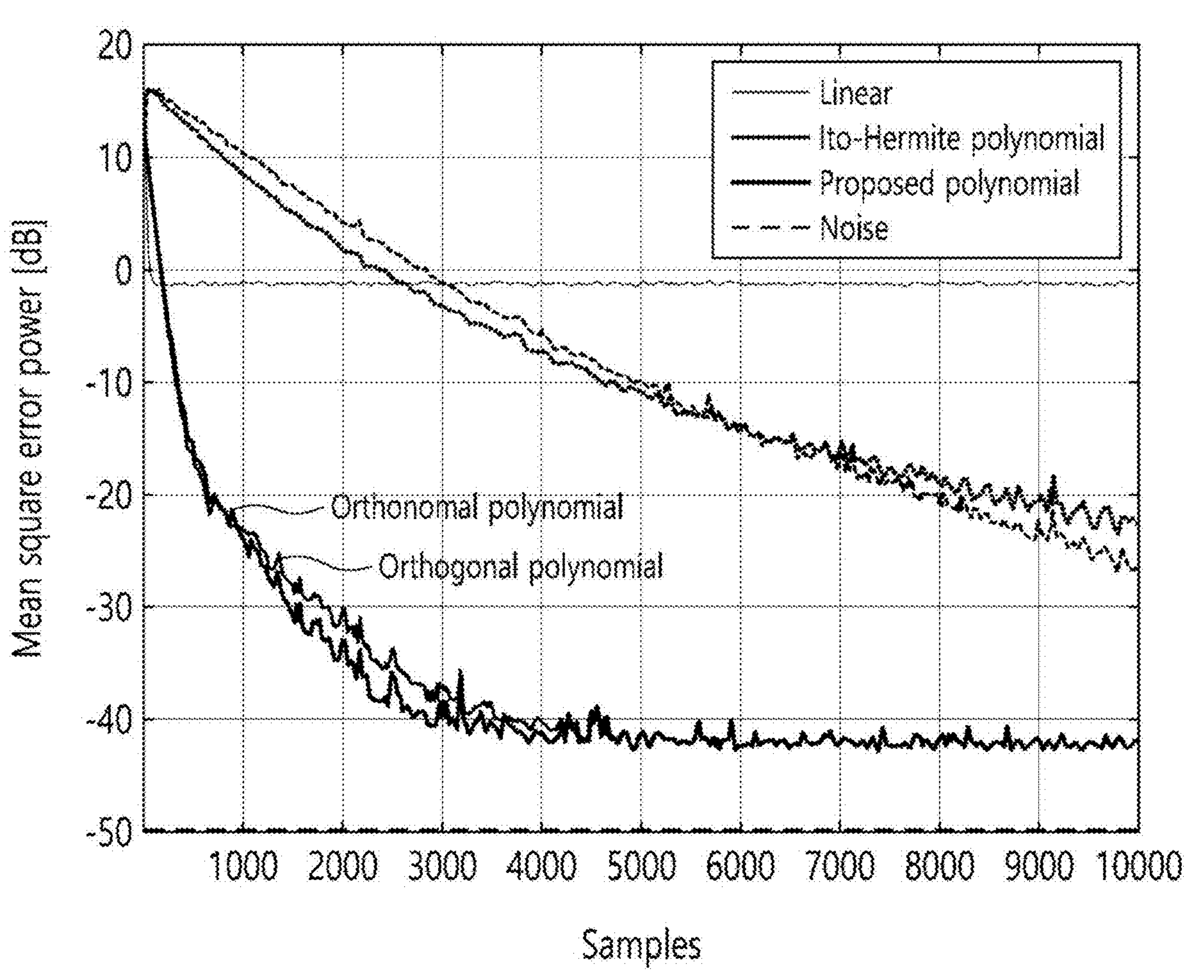
FIG. 9 is a view showing the effect according to existence of normalization of an algorithm according to an embodiment of the present disclosure, and is a result graph showing errors according to samples in the case of Gaussian distribution.

FIG. 9 is a view showing the effect according to existence of normalization of an algorithm according to an embodiment of the present disclosure, and is a result graph showing errors according to samples in the case of Gaussian distribution.

FIG. 9 shows the effect of normalization, and deterioration of performance occurs as a result of omitting normalization, and this is due to a large correlation.

Figure 10:
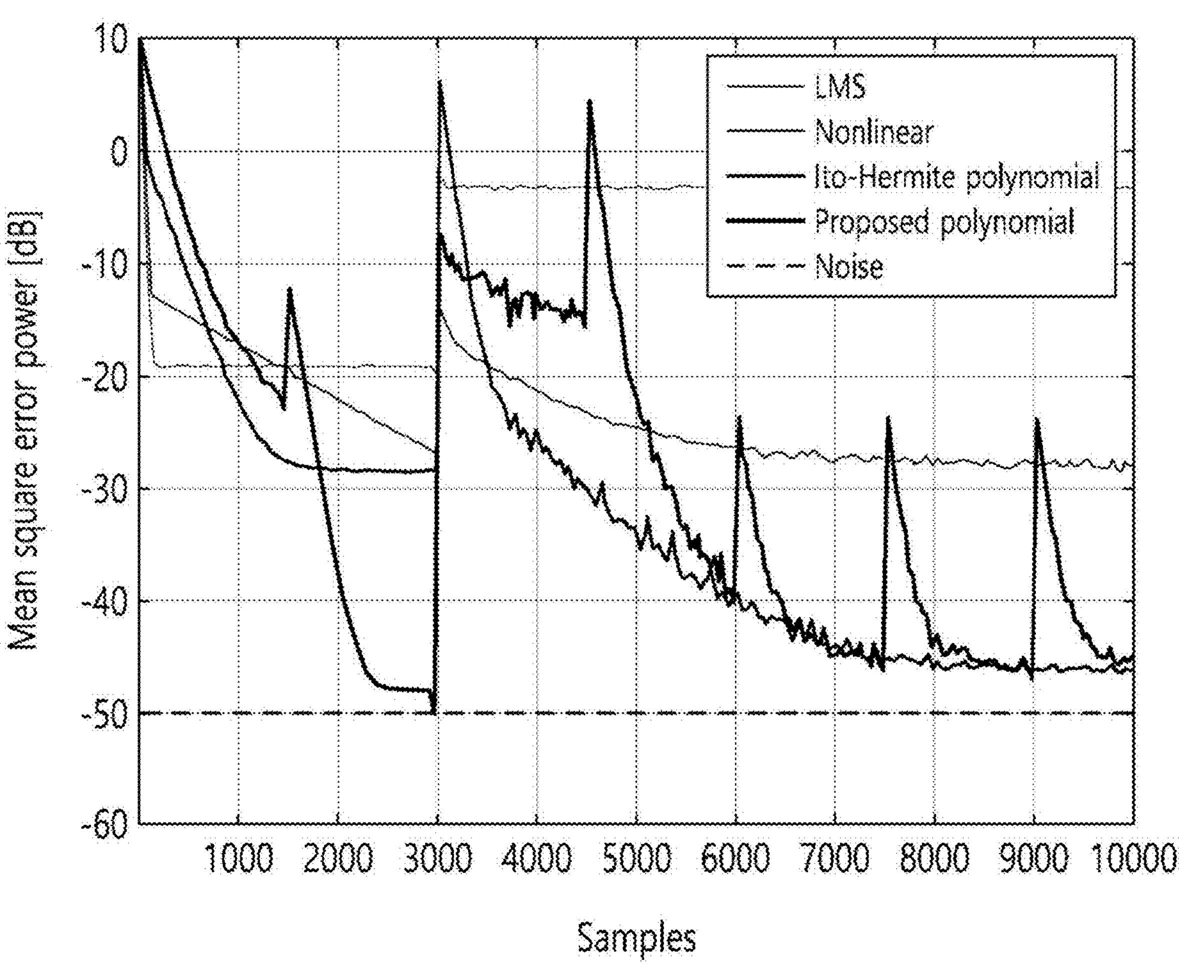
FIG. 10 is a view showing the effect of an algorithm with respect to an abnormal signal in an embodiment of the present disclosure, and is a result graph showing errors according to samples in the case of a distribution varying over time.

FIG. 10 is a view showing the effect of an algorithm with respect to an abnormal signal in an embodiment of the present disclosure, and is a result graph showing errors according to samples in the case of a distribution varying over time.

In FIG. 10, a nonstationary signal in which the moment may change over time is considered, and a data windowing method that updates the moment over time is used as a basic example of determining a change in the moment in the orthogonal polynomial generation unit. A signal having a uniform distribution of [0,1] is considered for 0 to 3,000 samples, and a signal having a Gaussian distribution is considered for 3,001 to 10,000 samples. As can be seen from corresponding results, although the converged level decreases to be close to the level of noise in the Gaussian distribution after 3,000 samples when ItÔ-Hermite is used as a basis, it is confirmed that there is significant performance deterioration in the uniform distribution before 3,000 samples. On the contrary, although it can be seen that the MSE value bounces as if the channel changes when the moment is updated in the proposed algorithm, it is confirmed that the converged level has an MSE level the same as or lower than that of the conventional algorithm in the uniform distribution and the Gaussian distribution.

According to one aspect of the present disclosure described above, as an integrated modeling and cancelling method for self-interference signals is proposed, frequency efficiency is enhanced by cancelling out-of-band emission signals in currently used half-duplex communication and therefore reducing the size of the guard band, or theoretically doubled frequency efficiency can be expected by cancelling in-band self-interference signals in full-duplex communication, which is one of next-generation communication technologies.

In addition, as orthogonal polynomials independently normalized from the distribution of the reception signal are used as a basis function, fast convergence is allowed regardless of distribution of transmission signals.

In addition, when in-band or out-of-band self-interference signals are cancelled as a result of an embodiment of the present disclosure, as techniques such as frequency shielding used to reduce adjacent frequency channel effects in a terminal or base station will no longer be used, it is expected that the integration rate of integrated circuits can be increased.

In addition, higher frequency efficiency can be expected from limited resources as full-duplex communication for next-generation communication is used.

The reception signal processing method of the present invention may be implemented in the form of program instructions that can be executed through various computer components and recorded in a computer-readable recording medium. The computer-readable recording medium may include program instructions, data files, data structures, and the like standalone or in combination.

The program instructions recorded in the computer-readable recording medium may be specially designed and configured for the present invention, or may be known and used by those skilled in the computer software field.

Examples of the computer-readable recording medium include magnetic media such as hard disks, floppy disks, and magnetic tapes, optical recording media such as CD-ROMs and DVDs, magneto-optical media such as floptical disks, and hardware devices specially configured to store and execute program instructions, such as ROM, RAM, flash memory, and the like.

Examples of the program instructions include high-level language codes that can be executed by a computer using an interpreter or the like, as well as machine language codes generated by a compiler. The hardware device may be configured to operate as one or more software modules to perform a process according to the present invention, and vice versa.

Although various embodiments of the present invention have been shown and described above, the present invention is not limited to the specific embodiments described above, and various modifications can be made by those skilled in the art without departing from the gist of the present invention as claimed in the claims, and these modified implementations should not be understood individually from the technical idea or perspective of the present invention.

DESCRIPTION OF SYMBOLS

10: Transceiver
20: Transmission signal processing device
100: Reception signal processing device
110: Reception unit
120: Moment generation unit
130: Orthogonal polynomial generation unit
140: Digital interference cancelling unit

What is claimed is:

1. A reception signal processing device for cancelling a self-interference signal generated by a transmission signal of a transceiver, the device comprising:

a receiver for receiving a reception signal including a self-interference signal;

a memory storing instructions; and a processor executing the instructions stored in the memory, wherein the instructions, when executed by the processor, cause the processor to:

generate a moment of the reception signal;

generate an orthogonal polynomial by calculating orthogonal polynomial coefficients from the moment; and cancel the self-interference signal included in the reception signal using the orthogonal polynomial, wherein the processor is configured to generate the moment from distribution of the reception signal using Equation 1 shown below, $$\mu_m = \frac{1}{N}\sum_n |x[n]|^m \quad \text{[Equation 1]}$$

Here, $\mu_m$ represents a moment, N represents a unit time, and x[n] represents a reception signal vector of n-th time.

2. The device according to claim 1, wherein the processor is configured to generate a matrix configured of vectors of the moments, and to calculate coefficients of the orthogonal polynomial based on the matrix.

3. The device according to claim 2, wherein the processor is configured to generate the orthogonal polynomial by performing normalization on the coefficients of the orthogonal polynomial.

4. The device according to claim 3, wherein the processor is configured to determine whether the moment changes over time, and updates the coefficients based on the change.

5. The device according to claim 4, wherein the processor is configured to cancel the self-interference signal by using the orthogonal polynomial as a basis function.

6. A reception signal processing method of cancelling a self-interference signal generated by a transmission signal of a transceiver, the method comprising:

receiving a reception signal including a self-interference signal;

generating a moment of the reception signal;

generating an orthogonal polynomial by calculating orthogonal polynomial coefficients from the moment; and cancelling the self-interference signal included in the reception signal using the orthogonal polynomial, wherein the generating the moment includes generating the moment from distribution of the reception signal using Equation 1 shown below, $$\mu_m = \frac{1}{N}\sum_n |x[n]|^m \quad \text{[Equation 1]}$$

Here, $\mu_m$ represents a moment, N represents a unit time, and x[n] represents a reception signal vector of n-th time.

7. The method according to claim 6, wherein the generating an orthogonal polynomial includes:

generating a matrix configured of vectors of the moments; and calculating coefficients of the orthogonal polynomial based on the matrix.

8. The method according to claim 7, wherein the generating the orthogonal polynomial further includes generating the orthogonal polynomial by performing normalization on the coefficients of the orthogonal polynomial.

9. The method according to claim 8, wherein the generating the orthogonal polynomial further includes:

determining whether the moment changes over time; and updating the coefficients based on the change.

10. The method according to claim 9, wherein the cancelling the self-interference signal includes cancelling the self-interference signal by using the orthogonal polynomial as a basis function.

* * * * *